(12) United States Patent
Beyda (10) Patent No.: US 7,206,306 B2
(45) Date of Patent: Apr. 17, 2007

(54) SYSTEM AND METHOD FOR EMERGENCY CALL DIVERSION

(75) Inventor: William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 1094 days.

(21) Appl. No.: 10/106,708

(22) Filed: Mar. 26, 2002

(65) Prior Publication Data

US 2003/0185200 A1    Oct. 2, 2003

(51) Int. Cl.
*H04L 12/66* (2006.01)
*H04L 12/56* (2006.01)
*H04M 3/42* (2006.01)

(52) U.S. Cl. .................. 370/352; 370/401; 379/211.01

(58) Field of Classification Search ...................... None
See application file for complete search history.

(56) References Cited

U.S. PATENT DOCUMENTS

| 6,654,722 B1 * | 11/2003 | Aldous et al. ........... 704/270.1 |
| 6,873,697 B2 * | 3/2005 | Andreason ............. 379/211.01 |
| 6,917,676 B2 * | 7/2005 | Yoshida et al. ........ 379/207.02 |
| 6,959,072 B1 * | 10/2005 | Lee ............................. 379/76 |

* cited by examiner

*Primary Examiner*—Andrew C. Lee (57) ABSTRACT

A distributed communication system that is capable of providing emergency call diversion during an event such as a power outage, network or sub-network failure, site closure, or the like, allows devices within the system affected by the event to rapidly inform one another that it is necessary to enter a call diversion state or mode during the duration of the outage. In this manner, calls may be diverted from different points within the network, or with different diversion behaviors as necessary.

36 Claims, 7 Drawing Sheets

| DEVICE | | CALL TYPE 608 | | |
|---|---|---|---|---|
| | | CALL TYPE 1 | CALL TYPE 2 | CALL TYPE N |
| DEVICE 1 | EVENT 1 | DIVERT ACTION | DIVERT ACTION | DIVERT ACTION |
| | EVENT 2 | DIVERT ACTION | DIVERT ACTION | DIVERT ACTION |
| | EVENT N | DIVERT ACTION | DIVERT ACTION | DIVERT ACTION |
| DEVICE 2 | EVENT 1 | DIVERT ACTION | DIVERT ACTION | DIVERT ACTION |
| | EVENT 2 | DIVERT ACTION | DIVERT ACTION | DIVERT ACTION |
| | EVENT N | DIVERT ACTION | DIVERT ACTION | DIVERT ACTION |
| DEVICE N | EVENT 1 | DIVERT ACTION | DIVERT ACTION | DIVERT ACTION |
| | EVENT 2 | DIVERT ACTION | DIVERT ACTION | DIVERT ACTION |
| | EVENT N | DIVERT ACTION | DIVERT ACTION | DIVERT ACTION |

FIG. 6

| DEVICE | | CALL TYPE | | |
|---|---|---|---|---|
| | | CALL TYPE 1 | CALL TYPE 2 | CALL TYPE N |
| DEVICE 1 | EVENT 1 | DIVERT ACTION | DIVERT ACTION | DIVERT ACTION |
| | EVENT 2 | DIVERT ACTION | DIVERT ACTION | DIVERT ACTION |
| | EVENT N | DIVERT ACTION | DIVERT ACTION | DIVERT ACTION |
| DEVICE 2 | EVENT 1 | DIVERT ACTION | USER DEFINED ACTION | DIVERT ACTION |
| | EVENT 2 | DIVERT ACTION | USER DEFINED ACTION | USER DEFINED ACTION |
| | EVENT N | USER DEFINED ACTION | DIVERT ACTION | DIVERT ACTION |
| DEVICE N | EVENT 1 | DIVERT ACTION | DIVERT ACTION | DIVERT ACTION |
| | EVENT 2 | DIVERT ACTION | DIVERT ACTION | DIVERT ACTION |
| | EVENT N | DIVERT ACTION | DIVERT ACTION | DIVERT ACTION |

SYSTEM AND METHOD FOR EMERGENCY CALL DIVERSION

BACKGROUND OF THE INVENTION

The present invention relates generally to distributed communication systems, in particular, telephony-over-local area network (LAN) (ToL) communication systems and the like, and more specifically to a system and method for providing emergency call diversion in a distributed communication system.

Distributed communication systems such as telephony-over-LAN (ToL) communication systems, and the like are highly complex networked systems containing a plurality of elements or devices for routing calls to users of the system. For example, an exemplary ToL system might include a network having two or more sub-networks, each sub-network including a plurality of clients providing communication services to multiple users. Such a ToL system may further include one or more gatekeepers for assisting in the routing of calls to destinations within the system, a gateway for interconnecting the ToL system with an external switched circuit network such as the public switched telephone network (PSTN) or a private branch exchange (PBX), a multipoint control unit (MCU) providing support for conferences of three or more clients, a messaging server, a feature server, and the like. Thus, for example, an external call might enter the system through a gateway, and with the assistance of a gatekeeper eventually reach a client terminal such as an IP (Internet Protocol) telephone or the like. If after a predetermined number of rings the call remains unanswered, the call may be passed to a message server so that a voice mail message may be recorded for the user. When an event such as a power failure, a network or sub-network outage, or a site closure due to weather or disaster renders elements of a ToL system inoperative, it is desirable to divert calls received during the event to a messaging server, voice-mail server, or the like so that the call may be answered. In conventional communication systems, which have a single point of entry for all calls, emergency call diversion may be accomplished by placing the call diversion function in a single device at the point of entry for the calls. Thus, a common diversion behavior is provided for the entire system. For example, in PBX systems, a night mode or bypass mode may be provided for diverting calls to another number, a message server, or to a special emergency telephone. However, in ToL systems calls may enter the system at multiple points and may be processed by multiple devices within the system. Thus, it may be impossible to accomplish call diversion in all cases by accessing a single device since, depending on the elements affected by the particular outage, call diversion must be implemented at different points within the system. Accordingly, a system administrator would need to reset parameters in many places within the system to accomplish call diversion in all cases. Moreover, different events may cause outages of different elements within the system, making different call diversion behaviors desirable or necessary depending on the type of call received.

Consequently, it is desirable to provide a distributed communication system capable of providing emergency call diversion during an event such as a power outage or the like. Such a communication system would employ a mechanism allowing elements within the system affected by an outage to rapidly inform one another that it is necessary to enter a call diversion state so that calls may be diverted from different points within the network as necessary.

SUMMARY OF THE INVENTION

The present invention is directed to a distributed communication system such as, for example, a telephony-over-LAN (ToL) communication system, that is capable of providing emergency call diversion during an event such as a power outage, network or sub-network failure, site closure, or the like. The distributed communication system allows elements or devices within the system affected by the event to rapidly inform one another that it is necessary to enter a call diversion state or mode during the outage. In this manner, calls may be diverted from different points within the network, and with different diversion behaviors as necessary.

According to a specific embodiment, the present invention provides a distributed communication system capable of providing emergency call diversion. The distributed communication system includes a client, a device for processing a call to the client via a network and a call diversion server for controlling call diversion within the distributed communication system. The call diversion server is capable of causing the call to be processed according to a set of predetermined diversion rules upon recognizing that a state exists within the distributed communication system requiring diversion of the call (e.g., upon receiving a divert command from a device within the distributed communication system). Preferably, the set of predetermined diversion rules are provided by a rules database cross-referencing devices in the distributed communication system with types of calls employing those devices for determining a desired diversion action to be taken to effect call diversion for the requested call. In exemplary embodiments, the call diversion server may be implemented as sets of instructions (i.e., software) distributed among one or more devices (e.g., a gateway, gatekeeper, etc.) within the distributed communication system.

According to another specific embodiment, the present invention provides a method for implementing call diversion in a distributed communication system. The method includes the steps of recognizing that a call diversion state exists for at least one device in the distributed communication system and processing a request for completion of a call employing the device or devices according to a set of predetermined diversion rules for providing diversion of the requested call. The step of recognizing that a call diversion state exists may include the step of receiving a divert command establishing the call diversion state where the divert command is provided in response to detection of an event requiring emergency call diversion. The step of processing a request for completion of a call employing the device may include querying a database cross-referencing devices in the distributed communication system with types of calls employing those devices for determining a desired diversion action to be taken to effect call diversion for the requested call. The method may further include steps for recognizing that the call diversion state has ended and resuming normal call processing. The step of recognizing that the call diversion state has ended may further include steps for receiving an end divert command for ending the call diversion state, where the end divert command is provided in response to detection that the event requiring emergency call diversion has passed.

According to another specific embodiment, the invention provides a method for implementing call diversion in a distributed communication system. The method includes the steps of detecting an event wherein call diversion is required and communicating a divert command to a device of the distributed communication system in response to detection of the event for placing the device in a call diversion mode. While in call diversion mode, the device is configured to process a request for completion of a call received according to a set of predetermined diversion rules for providing diversion of the call. The method may further include steps for detecting when the event requiring call diversion has passed and communicating an exit divert command to the device in response thereto for removing the device from the call diversion mode, where the device is configured to respond to the exit divert command by resuming normal call processing. In exemplary embodiments, the set of predetermined diversion rules comprises a rules database cross-referencing devices in the distributed communication system with types of calls employing those devices for determining a desired diversion action to be taken to effect call diversion for the requested call.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

DETAILED DESCRIPTION OF SPECIFIC EMBODIMENTS

Reference will now be made in detail to the presently preferred embodiments of the invention, examples of which are illustrated in the accompanying drawings.

Figure 1:
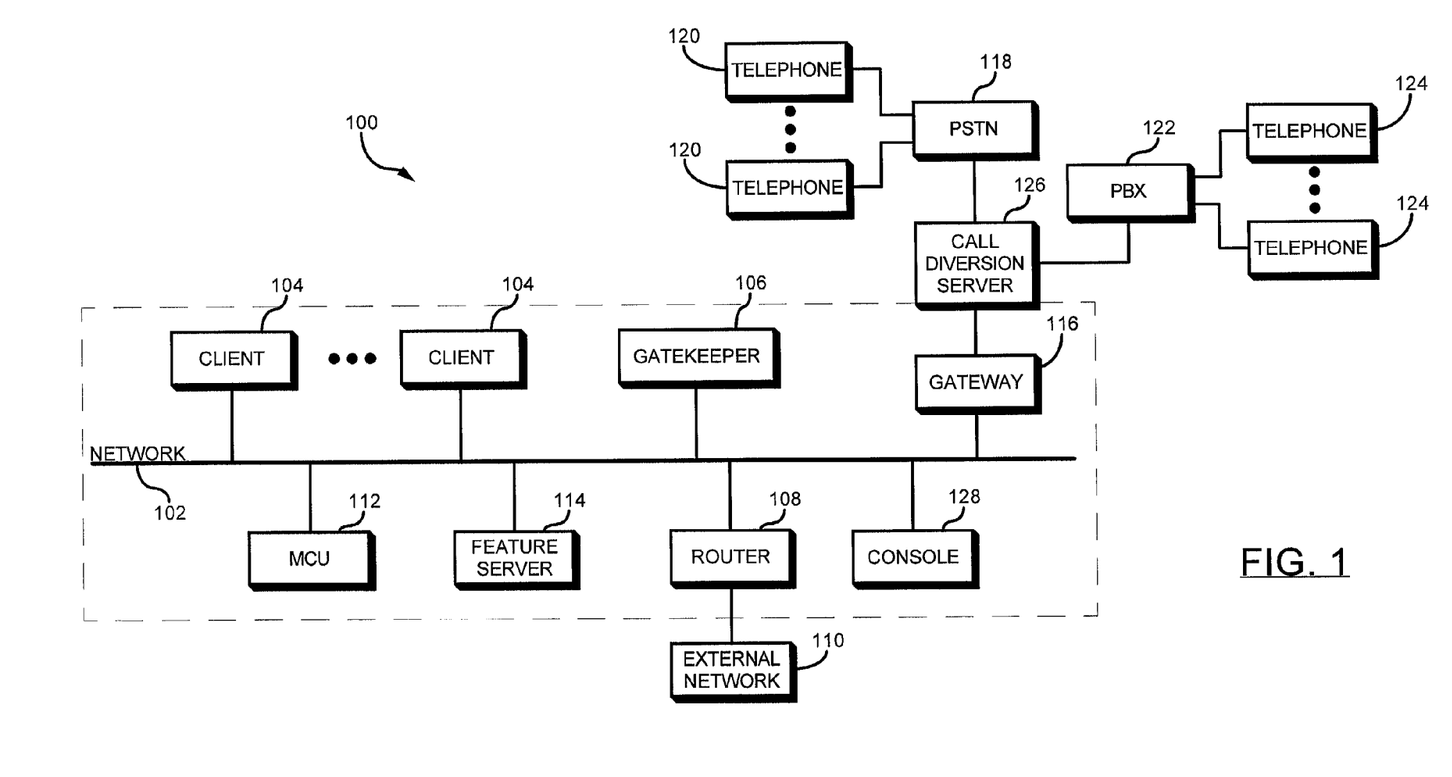
FIG. 1 is a block diagram illustrating a distributed communication system providing emergency call diversion in accordance with an exemplary embodiment of the present invention.

FIG. 1 illustrates a distributed communication system providing emergency call diversion in accordance with an exemplary embodiment of the present invention. In the exemplary embodiment shown, the distributed communication system is comprised of a ToL system 100 providing multimedia communication services including audio, video and data communications over a packet network 102 such as an IP network, an Internet packet exchange (IPX), local area network (LAN), enterprise network (EN), or the like. One or more endpoint terminals or clients 104 are coupled to packet network 102 for providing real-time bi-directional audio, and optionally video, and/or data communications. In exemplary embodiments, clients 104 may include "hard" clients such as IP telephones, terminal adapters coupled to analog telephones or facsimile machines and the like, or "soft" clients comprised of personal computers having audio (and optionally video) capability running suitable client software. ToL system 100 may further include one or more gatekeepers 106 for assisting in the process of routing calls to destinations (e.g., clients 104, message servers, etc.) within ToL system 100. Gatekeepers 106 may also provide services such as address resolution, admission control, and accounting. One or more routers 108 may be provided for routing calls over the network 102 and/or between the network 102 and an external network 110 employing like protocols. In exemplary embodiments of the invention, ToL system 100 includes a multipoint control unit (MCU) 112 for providing multipoint (i.e., conference) voice and video calls, a feature server 114 for providing supplementary services such as calling card authorization, call pickup/call park, and the like. ToL system 100 may further include one or more gateways 116 for interconnecting network 102 with a dissimilar network. Preferably, a gateway provides conversion of signaling protocols as well as media transmission formats between the networks. For example, in the embodiment shown, gateway 116 connects network 102 to a public switched telephone network (PSTN) 118 having telephones 120 and/or a PBX 122 having telephones 124. Gateway 116 provides conversion of the signaling protocols and media transmission formats of the PSTN 118 and PBX 122 and the ToL system network 102.

In accordance with the present invention, ToL system 100 includes a call diversion server, represented by block 126, for controlling call diversion behavior of devices within the ToL system, and optionally to legacy systems and devices coupled to the ToL system such as PBX 122. In exemplary embodiments, elements of call diversion server 126 may be implemented as software comprised of sets of instructions distributed among multiple devices within the ToL system 100. In this manner, calls received in the ToL system 100 may be diverted from different points within the network, and with different diversion behaviors as necessary. Additionally, call diversion server 126 may include one or more specialized call diversion devices coupled to network 102 or alternately to devices coupled to network 102. Such call diversion devices may be necessary to provide internetworking with legacy systems and devices such as PSTN 118 and PBX 122. For instance, in the embodiment shown in FIG. 1, call diversion server 126 may be implemented as software distributed between gatekeeper 106 and gateway 116, or alternately as a specialized device disposed between gateway 116 and external networks such as PSTN 118 and PBX 122. In this manner, call diversion server may provide desired call diversion for a variety of system outages ranging from outages of the entire network 102 or a sub-network of network 102 (in embodiments where network 102 comprises multiple sub-networks) due to events such as power outages, router failures, gatekeeper failures, gateway failures, to outages or inadvertent or intentional disconnection of a single device such as a client 104, MCU 112, message server, or the like.

Call diversion server 126 causes a call received in the ToL system 100 to be processed according to a set of predetermined diversion rules upon recognizing that a state exists within the system 100 requiring diversion of the call. In this manner, a call received within the ToL system 100 may be diverted to a safe destination such as a message server, a voice mail server, or the like and not go unanswered. In exemplary embodiments, these predetermined diversion rules may be provided by a database or the like (see FIG. 6) accessible by elements of the call diversion server 126 of a given device.

In exemplary embodiments, the existence of a call diversion state or mode (i.e., a state requiring call diversion for at least one device within the ToL system 100) is communicated to call diversion server 126 via a divert protocol element or command (hereinafter referred to as "EnterDivertMode") provided in response to detection of an event such as a power outage or the like, wherein call diversion is required. The EnterDivertMode command may be sent to all devices within ToL system 100 affected by the event on which elements call diversion server is implemented. All affected devices can go into the call diversion state or mode. Each such device, depending on its function within the network 102, is configured to respond to the EnterDivertMode command in a manner allowing desired call diversion to be implemented. For example, in the embodiment wherein call diversion server 126 is distributed between gatekeeper 106 and gateway 116, gateway 116 may be configured to route calls to an alternate site or an offsite voice mail system upon receiving the EnterDivertMode command. Similarly, gatekeeper 106 may automatically route internal calls directly to a message server rather than to a client 104 such as a desktop telephone or the like, knowing via receipt of the EnterDivertMode command that the client 104 is not operational, and thus would not properly forward the call to the message server on ring-no answer conditions.

In exemplary embodiments, the EnterDivertMode command may be issued from a central network management console 128 coupled to network 102. Alternately, the command may be issued by an affected device (e.g., gatekeeper 106, gateway 116, or the like). Moreover, the EnterDivertMode command may be issued by a human operator (e.g., via central network management console 128, or the like), or may be initiated algorithmically based on alarms triggered by the event.

When the event requiring call diversion has passed (e.g., power is restored or the failure condition is resolved, etc.), the call diversion state is ended. Call diversion server 126 recognizes that the call diversion state has passed and causes normal call processing to be resumed. In exemplary embodiments, the end of the call diversion state is communicated to call diversion server 126 via a second divert protocol element or command (hereinafter referred to as "ExitDivertMode") provided in response to detection that the event requiring call diversion has passed. The ExitDivertMode command may be sent to all devices within ToL system 100 that were also sent the EnterDivertMode command. Like the EnterDivertMode command, the ExitDivertMode command may be issued from a central network management console 128 coupled to network 102, or alternately, may be issued by an affected device (e.g., gatekeeper 106, gateway 116, or the like). Further, the ExitDivertMode command may be issued by a human operator (e.g., via central network management console 128 or the like), or may be initiated algorithmically when alarms triggered by the event have been resolved.

ToL system 100 thus replicates the diversion capability of a PBX by using protocol elements or commands EnterDivertMode and ExitDivertMode for communicating between the affected ToL system devices, allowing the call diversion to occur manually or automatically based on a single input, event alarm, or multiple inputs or alarms. In embodiments of the invention, the list of devices within ToL system 100 which receive EnterDivertMode and ExitDivertMode commands in response to a specific event is preconfigured, prior to occurrence of the event so that fast call diversion may be accomplished when the event actually occurs. However, if multicast is enabled within the ToL system 100, such preconfiguration is not necessary, since EnterDivertMode and ExitDivertMode commands may be routed to multiple devices within the ToL system simultaneously.

Figure 2:
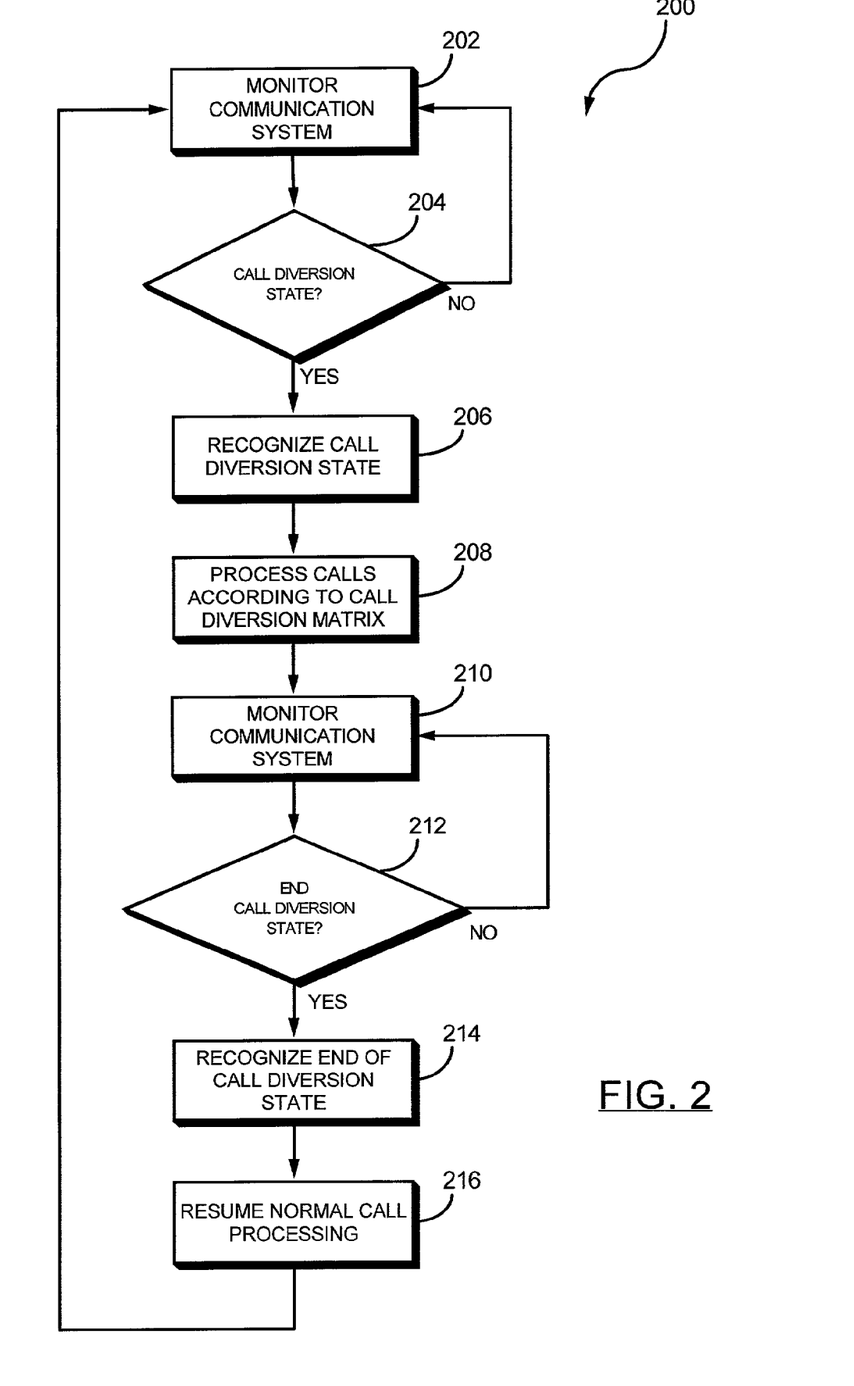
FIG. 2 is a flow diagram illustrating an exemplary method for providing emergency call diversion within a distributed communication system such as the system shown in FIG. 1.
Figure 3:
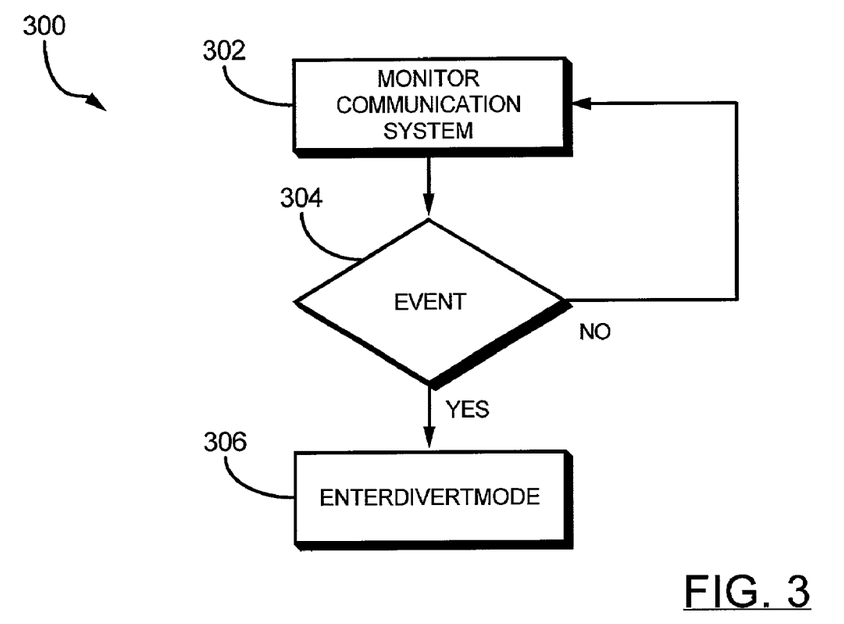
FIG. 3 is a flow diagram illustrating an exemplary method for allowing devices within a distributed communication system to notify one another of the need to enter a call diversion state.
Figure 4:
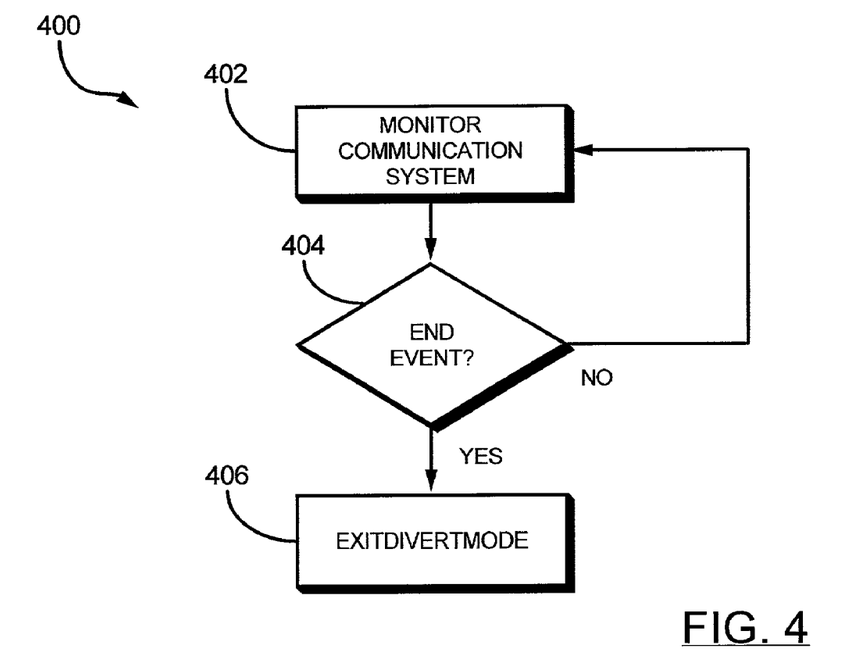
FIG. 4 is a flow diagram illustrating an exemplary method for allowing devices within a distributed communication system to notify one another that the call diversion state is to be exited.

Referring now to FIGS. 2, 3 and 4, an exemplary method for providing emergency call diversion within a distributed communication system such as the ToL system 100 shown in FIG. 1 is described. The method 200 comprises monitoring the ToL system 100 at step 202 to determine the existence of a state requiring call diversion, at step 204. For instance, in the method 300 embodied in FIG. 3, the ToL system may be monitored at step 302 for the occurrence of an event such as a power outage, gateway failure, router failure, gatekeeper failure, or the like, wherein call diversion is required. If at step 304 such an event is determined to have occurred, an EnterDivertMode command is sent to devices within the ToL system affected by the event. As discussed in the description of FIG. 1, the EnterDivertMode command may be issued by a human operator (e.g., via central network management console 128 or the like), or may be initiated algorithmically by affected devices within the ToL system based on alarms triggered by the event.

Upon receiving the EnterDivertMode command sent at step 306, affected devices within the ToL system recognize the existence of a call diversion state within the system at step 206. The affected devices may then process calls that would normally be routed through devices affected by the event according to a set of predetermined diversion rules for providing diversion of the requested call at step 208. For instance, in exemplary embodiments of the invention, processing of calls in step 208 is accomplished by querying a database cross-referencing devices in the distributed communication system with types of calls employing those devices for determining a desired diversion action to be taken to effect call diversion for the requested call. Such a database is described in the discussion of FIG. 6.

While in the call diversion state, the ToL system may again be monitored at step 210 to determine when the call diversion state has ended, at step 212. For instance, in the method 400 embodied in FIG. 4, the ToL system may be monitored at step 402 for the end or resolution of the event requiring call diversion. If at step 404 the event is determined to have been resolved, an ExitDivertMode command is sent at step 406 to devices within the ToL system to which the EnterDivertMode command was sent in step 306 (FIG. 3). Like the EnterDivertMode, the ExitDivertMode command may be issued by a human operator (e.g., via central network management console 128 (FIG. 1), or the like), or may be initiated algorithmically when alarms triggered by the event have been resolved. Upon receiving the ExitDivertMode command sent at step 406, affected devices within the ToL system recognize the end of the call diversion state within the system at step 214 and resume normal call processing at step 216.

Figure 5:
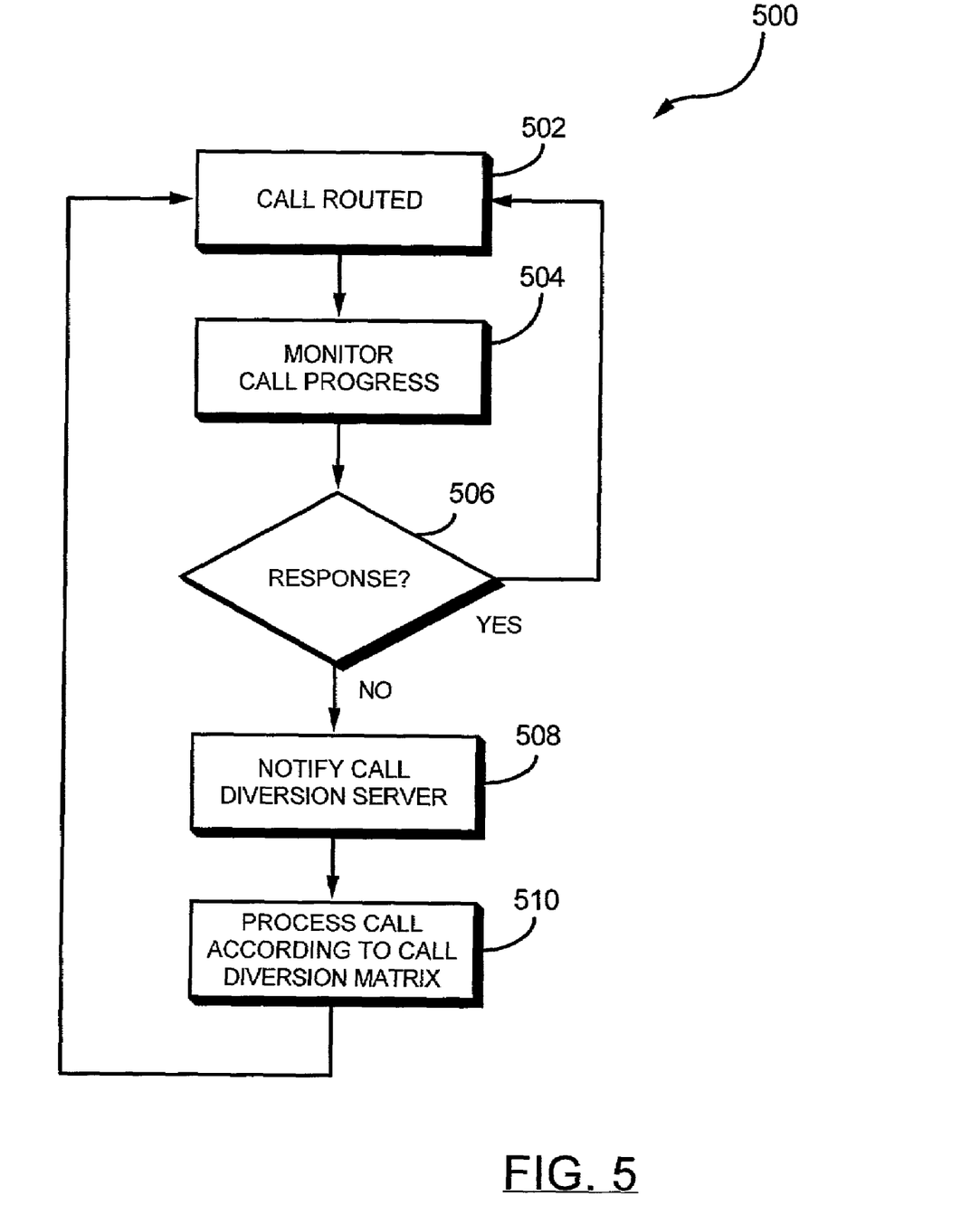
FIG. 5 is a flow diagram illustrating an exemplary method for providing call diversion for a device within a distributed communication system such as the system shown in FIG. 1.

Referring now to FIG. 5, an exemplary method for providing call diversion for a device within a distributed communication system such as the system shown in FIG. 1 is described. The method 500 is initiated when a call is routed to a client 104 within the ToL system 100 (see FIG. 1) at step 502. The call progress is monitored at step 504 for determining whether an appropriate response is provided. Appropriate responses include any normal response to a call. For instance, the call may be completed to the client 104 in a normal fashion, or the call may be routed to a message or voicemail server, a pager, a mobile telephone, or the like if the client does not answer. In exemplary embodiments, the call may activate a timer in elements of call diversion server 126 resident in gatekeeper 106 (FIG. 1). If the call does not receive an appropriate response at step 506 so that answer supervision is returned to the gatekeeper before the timer times out, the call diversion server 126 is notified at step 508, and the call is processed according to a set of predetermined diversion rules for providing diversion of the call at step 510. For instance, in exemplary embodiments of the invention, processing of calls in step 510 is accomplished by querying a database cross-referencing devices in the distributed communication system with types of calls employing those devices for determining a desired diversion action to be taken to effect call diversion for the requested call. Such a database is described in the discussion of FIGS. 7 and 8. Preferably, the diversion behavior initiated at step 512 lasts only for the duration of the call so that transient events (e.g., a user momentarily unplugging and immediately replugging the network cable of her telephone or her computer system, etc.) do not result in unwanted diversion of calls.

Figure 6:
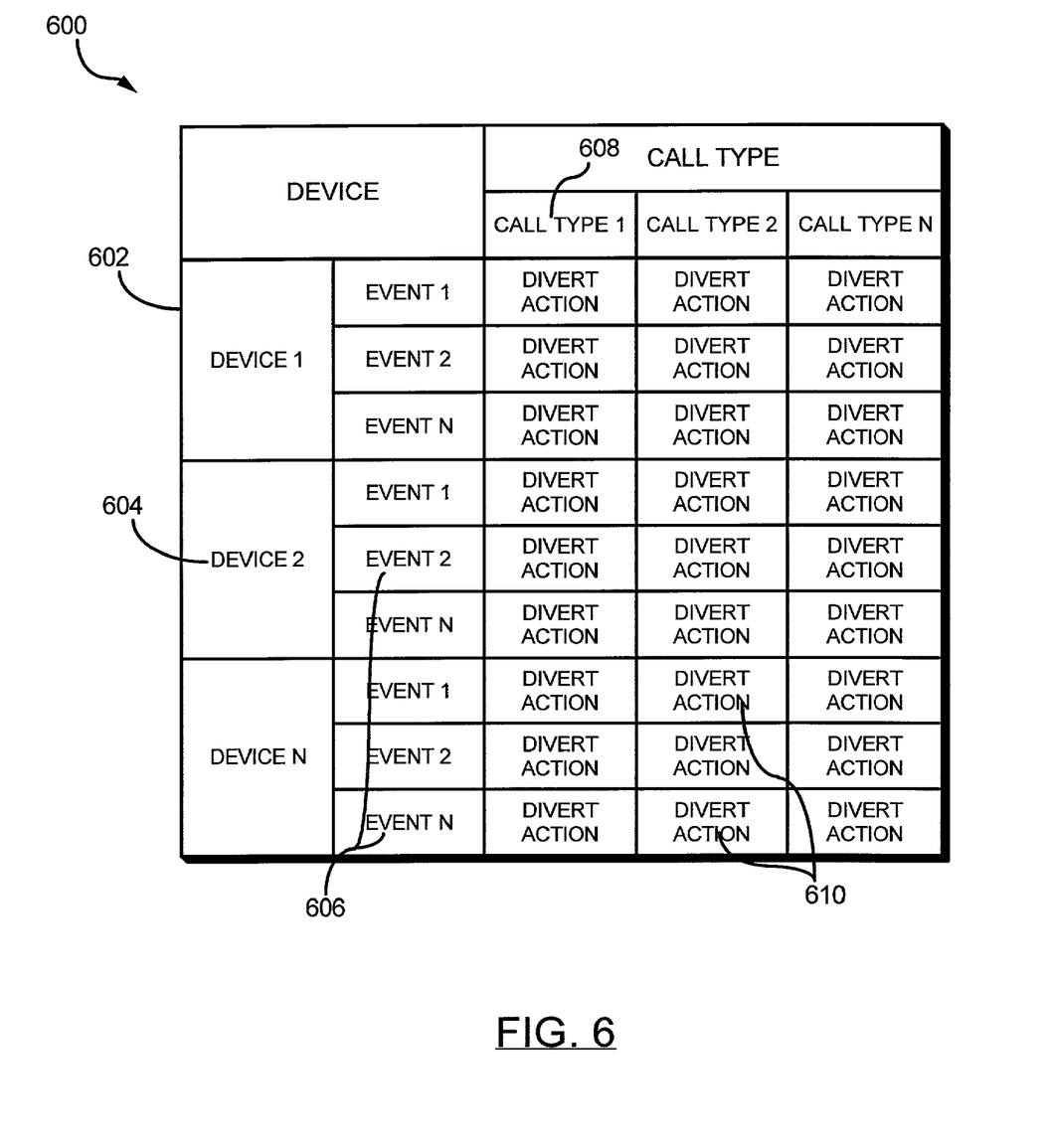
FIG. 6 is a table representing an exemplary rules database for providing rules based call diversion in a distributed communication system such as the system shown in FIG. 1.
Figure 7:
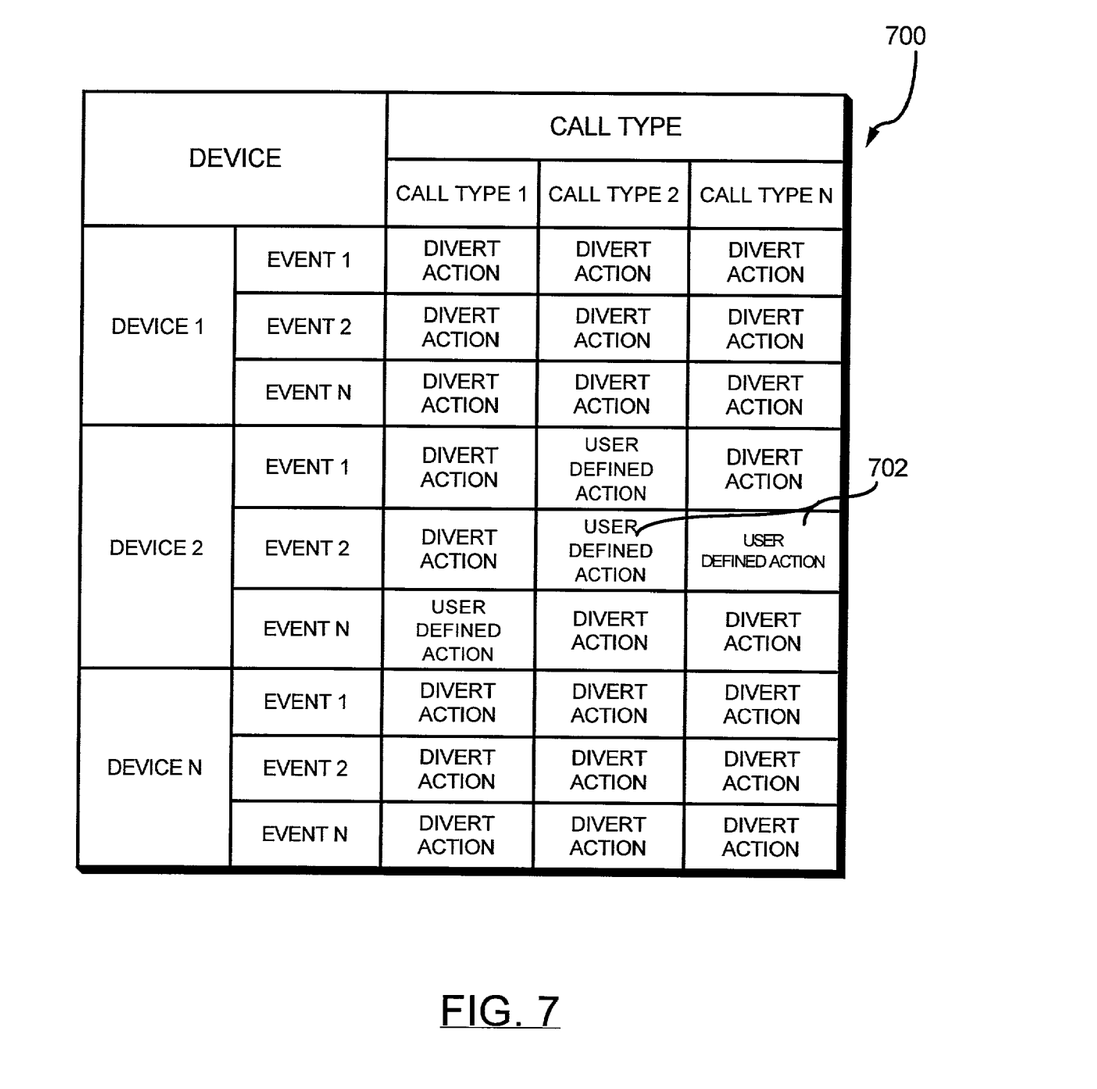
FIG. 7 is a table representing an exemplary rules databases for providing rules based call diversion in a distributed communication system, wherein call diversion actions may be defined by a user of a device within the system.

Turning now to FIGS. 6 and 7, an exemplary rules database for providing rules based call diversion in a distributed communication system such as the ToL system 100 shown in FIG. 1 is described. Rules database 600 is comprised of a matrix 602 cross-referencing device identifications (e.g., "DEVICE 1, DEVICE 2, . . . DEVICE N") 604 within the ToL system and possible outage events (e.g., EVENT 1, EVENT 2, . . . EVENT N") 606 for those devices with types of calls (e.g., "CALL TYPE 1, CALL TYPE 2, . . . CALL TYPE N") 608 processed by the system for determining a desired diversion action ("DIVERT ACTION") 610 to be taken to effect a desired call diversion for a given call. In the embodiment shown in FIG. 6, call types 608 are listed in columns within the matrix 602, while device identifications 604 and associated outage events 606 are listed in rows of the matrix 602. Thus, the diversion action 610 to be taken for a given outage type 606 and call type 608 is provided in the intersecting matrix box of a row containing the appropriate outage event 606 for a given device 604 and a column containing the appropriate call type 608. It will be appreciated by those of skill in the art that the arrangement of matrix 602 is representative of one exemplary embodiment, and other arrangements are possible. For example, a matrix having an alternative arrangement may list call types 608 in rows of the matrix, while device identifications 604 and outage events 606 are listed in columns of the matrix. Accordingly, rearrangement of matrix 602 would not depart from the scope and spirit of the present invention. Moreover, it is contemplated that database structures capable of cross-referencing device identifications 604 and possible outage events 606 for those devices with types of calls 608 processed may be provided that do not employ a matrix or table structure (i.e., a relational database or the like). Accordingly, use of such databases in place of the matrix-based database shown in FIG. 6 would not depart from the scope and spirit of the invention as presented in the appended claims.

As shown in FIG. 1, an exemplary ToL system 100 may include multiple devices including, but not limited to, clients 104 such as an IP telephone or personal computer based soft client, gatekeeper 106, MCU 112, feature server 114, and gateway 116, interconnected via network 102. A system administrator may create a hierarchical rules database 600 for the ToL system 100 that is then distributed to devices within the ToL system on which elements of call diversion server 126 are resident, or alternately stored to a centralized server, that may be accessed by these devices. Preferably, the system administrator identifies each device within the ToL system 100 via a device identification 604 within the matrix 602. Outage events 606 are then determined for the device and cross-referenced with call types 608 the device may process to provide an appropriate diversion action 610. For example, an external call into ToL system 100 may be diverted to a message server if, for example, a client is not responding (see FIG. 5). Similarly, failure of the network 102 (or alternately a sub-network within network 102) may cause the call to be forwarded to an offsite messaging system (see FIG. 8).

As shown in FIG. 7, users may add additional information to rules database 600 to provide user defined diversion actions for certain outage events. For example, a user having a web-based interface with network 102 (FIG. 1) may indicate his or her preferences for outage events that a device or devices he or she uses (e.g., an IP telephone, personal computer soft client, etc.) may experience. These preferences may then be inserted into database 700 as user defined call diversion actions 702 or the like. For example, a user of an IP telephone may indicate that he or she wants calls to the IP telephone forwarded to a cellular telephone should his or her telephone sub-network experience an outage event, and then to a message server if no response is provided to the call by the cellular telephone.

Figure 8:
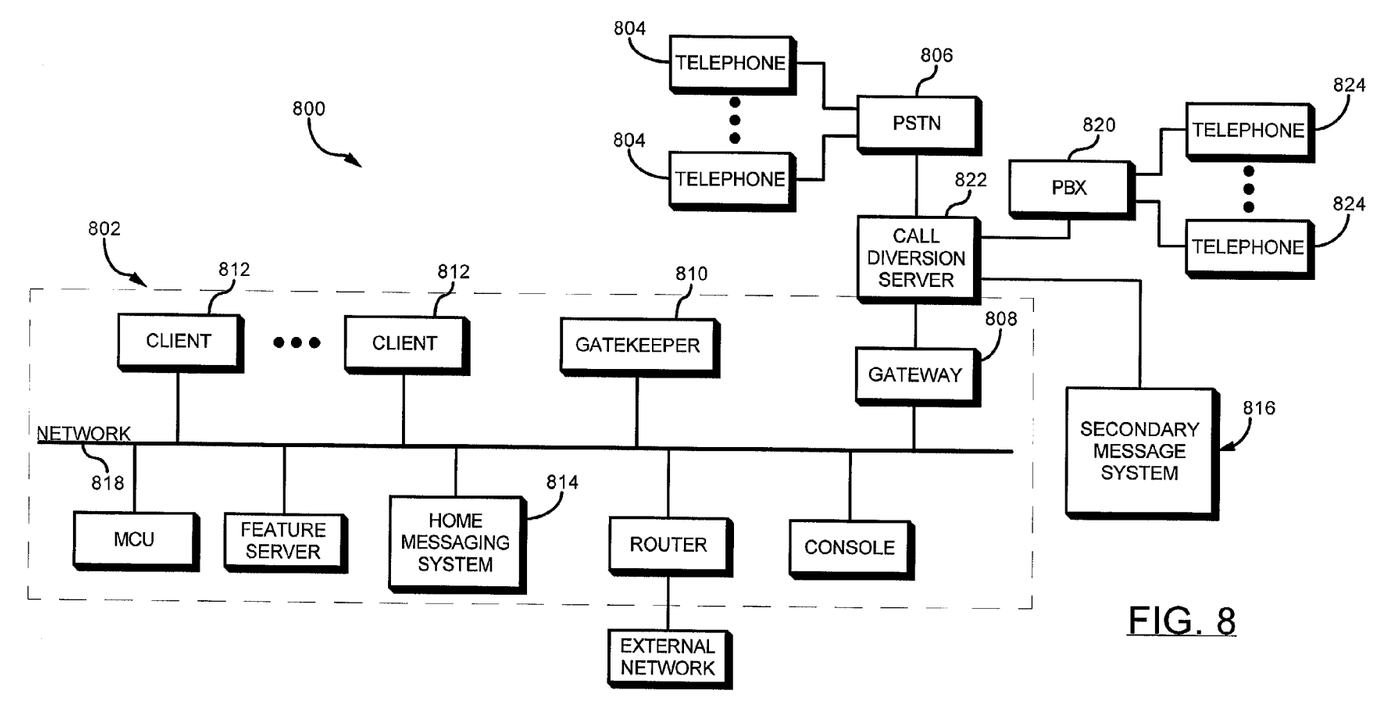
FIG. 8 is a block diagram illustrating an exemplary distributed communication system employing a secondary message system providing temporary storage of messages that cannot reach destinations within a distributed communication system due to network or equipment failure or outage.

FIG. 8 depicts an exemplary distributed communication system employing a secondary message system providing temporary storage of messages that cannot reach destinations within a distributed communication system due to network or equipment failure or outage. In the exemplary embodiment shown, the distributed communication system 800 is comprised of a ToL system 802 such as ToL system 100 described in the discussion of FIG. 1. Because of the complexity of typical ToL systems such as ToL system 802, forwarding of calls to messaging systems within a ToL system 802 may involve many steps. For example, a call from an external caller (e.g., a telephone 804 of PSTN 806) may first go through gateway 808. The gateway may then consult gatekeeper 810 and be routed to a client 812 such as an IP phone, or the like. If client 812 provides no response, the call may be forwarded to a messaging system 814 where a voicemail message may be left for the user. During an event such as a network outage or equipment failure, it is likely that an external caller may be unable to leave a message on the messaging system 814 because gateway 808 cannot reach through the broken network to reach the messaging system.

In accordance with the present invention, an external or secondary messaging system 816 is coupled to the ToL system 802 for providing a temporary storage cache where messages may be left when elements of ToL system 802 cannot be reached due to such outage events. Preferably, secondary messaging system 816 is set up outside the area of ToL system 802 that may be subject to the outage event.

For instance, in exemplary embodiments, secondary messaging system 816 may be off-site (i.e., located in a separate facility or building), or if on-site may be located near the entry point to network 818 (e.g., near gateway 808), allowing ToL system outages and failures to be hidden from external callers. In this manner, the secondary messaging system 816 serves as a failure recovery mechanism for ToL system 802.

In exemplary embodiments, secondary messaging system 816 may be equipped with default greetings. In one embodiment, secondary messaging system 816 may play a generic greeting (e.g., "The party you have called is not available"). Alternately, secondary messaging system 816 may play an individualized system greeting (e.g., "The party you have called at extension 2123 is not available"). In such embodiments, secondary messaging system 816 may be configured to store a recorded name database. Secondary messaging system 816 may play an individualized, recorded greeting including the appropriate user name (e.g., "The party you have called, John Jones, at extension 2123, is not available"). In further embodiments, secondary messaging system 816 may periodically retrieve stored, recorded greetings from the home messaging system of the party called. This message may then be played during outage or failure events, further hiding such events from the caller (i.e., the caller leaves a message on a messaging system he or she believes is in the home system of the party called). Preferably, messages left by callers during the outage or failure event are later forwarded to the home system when the outage event has passed.

The initial entry device to the ToL system 802 (e.g., a gateway 808 or PBX 820) diverts calls to the secondary messaging system 816 when the downstream systems are unavailable due to an outage event. Preferably, the initial entry device includes appropriate digital signal processing (DSP) hardware as needed for codec/tone functions. For instance, in the exemplary embodiment shown in FIG. 8, diversion of calls to secondary messaging system 816 is provided by call diversion server 822, which may be comprised of software resident on gateway 808 or of a separate stand alone device coupled to gateway 808. The caller may then leave a message in a mailbox in the secondary messaging system 816.

In exemplary embodiments, each mailbox in secondary messaging system 816 is identified using conventional means (e.g., via identification information entered by the caller, through Direct Inward Dial (DID)/called number identification techniques, or the like). The identification of the home messaging system employed by the user may be stored within the configuration of the mailbox assigned to the user within secondary messaging system 816. When the outage event is over, secondary messaging system 816, which regularly polls the home system to check for its fitness, may relay the message to the home system and clear its storage cache. Secondary messaging system 816 may further provide offsite retrieval functions for allowing message retrieval by the user during the outage from an external location (e.g., an external PSTN telephone 804, a PBX telephone 824, or the like) during or after the outage event.

In embodiments of the invention, ToL systems 100 (FIG. 1) and 802 (FIG. 8) may employ protocol complying with the H.323 protocol standard promulgated by the International Telecommunication Union (ITU). The H.323 protocol standard is incorporated herein by reference in its entirety. However, it is contemplated that the present invention may be employed by distributed communication systems employing other protocol standards. For instance, in one embodiment, ToL system may alternately employ protocol complying with the session initiation protocol (SIP) standard or the media gateway control protocol (MGCP) standard, both developed by the Internet Engineering Task Force (IETF), which are incorporated herein by reference in their entirety. Accordingly, implementation of the present invention in such distributed communication systems would not depart from the scope and spirit of the invention.

Although the invention has been described with a certain degree of particularity, it should be recognized that elements thereof may be altered by persons skilled in the art without departing from the scope and spirit of the invention. It is understood that the specific order or hierarchy of steps in the methods 200, 300, 400 & 500 illustrated in FIGS. 2, 3, 4 and 5 are examples of exemplary approaches. Based upon design preferences, it is understood that the specific order or hierarchy of this method can be rearranged while remaining within the scope of the present invention. The accompanying method claims present elements of the various steps of method 200, 300, 400 & 500 in a sample order, and are not meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A distributed communication system providing emergency call diversion, comprising:
   a client;
   a device for processing a call to the client via a network of the distributed communication system; and
   a call diversion server for controlling call diversion within the distributed communication system,
   wherein, upon recognizing that a state exists within the distributed communication system requiring diversion of the call, the call diversion server causing the call to be processed according to a set of predetermined diversion rules so that the call is diverted, the set of predetermined diversion rules comprising a rules database cross-referencing the device with types of calls employing the device for determining a desired diversion action to be taken to effect call diversion for the requested call.

2. The distributed communication system as claimed in claim 1, wherein the call diversion server is implemented as a program of instructions executed by the device, and wherein control of call diversion is distributed through the distributed communication system.

3. The distributed communication system as claimed in claim 1, wherein the device comprises a gateway for connecting the distributed communication system with a second communication system for providing communication between the second communication system and the client.

4. The distributed communication system as claimed in claim 3, wherein the second communication system comprises at least one of a public switched telephone network (PSTN) and a private branch exchange (PBX).

5. The distributed communication system as claimed in claim 3, further comprising a gatekeeper.

6. The distributed communication system as claimed in claim 5, wherein the call diversion server is implemented as a program of instructions executed by at least one of the gateway and the gatekeeper so that control of call diversion is distributed between the gateway and the gatekeeper.

7. The distributed communication system as claimed in claim 1, wherein a divert command is provided to the call diversion server for informing the call diversion server of the call diversion state, the divert command being provided in response to detection of an event wherein call diversion is required.

8. The distributed communication system as claimed in claim 1, wherein the call diversion server causes normal call processing to be resumed upon recognizing that the call diversion state has passed.

9. The distributed communication system as claimed in claim 8, wherein an end divert command is provided to the call diversion server for informing the call diversion server that the call diversion state has ended, the end divert command being provided in response to detection that the event requiring call diversion has ended.

10. The distributed communication system as claimed in claim 1, wherein the distributed communication system comprises a telephony-over-LAN (ToL) system.

11. The distributed communication system as claimed in claim 1, wherein the distributed communication system employs at least one of H.323 protocol and session initiation protocol (SIP).

12. The distributed communication system as claimed in claim 1, wherein the device comprises at least one of a gateway, a gatekeeper, a client, and a private branch exchange (PBX).

13. A method for providing call diversion in a distributed communication system, comprising:
recognizing that a call diversion state exists for at least one device in the distributed communication system; and
processing a request for completion of a call employing the at least one device according to a set of predetermined diversion rules for providing diversion of the call, wherein the step of processing a request for completion of a call employing the at least one device comprises querying a database cross-referencing the at least one device with types of calls employing the device for determining a desired diversion action to be taken to effect call diversion for the requested call.

14. The method as claimed in claim 13, wherein the step of recognizing that a call diversion state exists comprises receiving a divert command establishing the call diversion state, the divert command being provided in response to detection of an event wherein emergency call diversion is required.

15. The method as claimed in claim 13, further comprising recognizing that the call diversion state has ended and resuming normal call processing.

16. The method as claimed in claim 15, wherein the step of recognizing that the call diversion state has ended comprises receiving an end divert command for ending the call diversion state, the end divert command being provided in response to detection that the event requiring call diversion has passed.

17. The method as claimed in claim 13, wherein the step of recognizing that a call diversion state exists comprises receiving a divert command establishing that a call diversion state exists for the at least one device, the divert command being provided upon detection that a response has not been provided to the request.

18. The method as claimed in claim 13, wherein the distributed communication system is a telephony-over-LAN (ToL) system.

19. The method as claimed in claim 13, wherein the distributed communication system employs at least one of H.323 protocol and session initiation protocol (SIP).

20. The method as claimed in claim 13, wherein the at least one device comprises at least one of a gateway, a gatekeeper, a client, and a private branch exchange (PBX).

21. A method for providing call diversion in a distributed communication system, comprising:
detecting an event wherein call diversion is required; and
communicating a divert command to a device of the distributed
communication system in response to detection of the event for placing the device in a call diversion mode, the device processing a request for completion of a call received while the device is in the call diversion mode according to a set of predetermined diversion rules for providing diversion of the call, wherein the set of predetermined diversion rules comprises a rules database cross-referencing the device with types of calls employing the device for determining a desired diversion action to be taken to effect call diversion for the requested call.

22. The method as claimed in claim 21, further comprising detecting when the event requiring call diversion has passed and communicating an exit divert command to the device in response thereto for removing the device from the call diversion mode, the device being configured to respond to the exit divert command by resuming normal call processing.

23. The method as claimed in claim 21, wherein the distributed communication system is a telephony-over-LAN (ToL) system.

24. The method as claimed in claim 21, wherein the distributed communication system employs at least one of H.323 protocol and session initiation protocol (SIP).

25. The method as claimed in claim 21, wherein the device comprises one of a gateway, a gatekeeper, a client, and a private branch exchange (PBX).

26. A distributed communication system, comprising:
means for recognizing that a call diversion state exists for at least one device in the distributed communication system; and
means for processing a request for completion of a call employing the at least one device according to a predetermined call diversion rule, wherein the means for processing a request for completion of a call employing the at least one device comprises means for querying a database cross-referencing the at least one device with types of calls employing the device for determining a desired diversion action to be taken to effect call diversion for the requested call.

27. The distributed communication system as claimed in claim 26, wherein the means for recognizing that a call diversion state exists comprises means for receiving a divert command establishing the call diversion state, the divert command being provided in response to detection of an event wherein emergency call diversion is required.

28. The distributed communication system as claimed in claim 26, further comprising means for recognizing that the call diversion state has ended and resuming normal call processing.

29. The distributed communication system as claimed in claim 28, wherein the means for recognizing that the call diversion state has ended comprises means for receiving an end divert command for ending the call diversion state, the end divert command being provided in response to detection that the event requiring call diversion has passed.

30. The distributed communication system as claimed in claim 26, wherein the means for recognizing that a call diversion state exists comprises means for receiving a divert command establishing that a call diversion state exists for the at least one device, the divert command being provided upon detection that a response has not been provided to the request.

31. The distributed communication system as claimed in claim 26, wherein the distributed communication system employs at least one of H.323 protocol and session initiation protocol (SIP).

32. The distributed communication system as claimed in claim 26, wherein the at least one device comprises at least one of a gateway, a gatekeeper, a client, and a private branch exchange (PBX).

33. A distributed communication system, comprising:
means for detecting an event wherein call diversion is required; and
means for communicating a divert command to a device of the distributed communication system in response to detection of the event for placing the device in a call diversion mode, the device processing a request for completion of a call received while the device is in the call diversion mode according to a set of predetermined diversion rules for providing diversion of the call if necessitated by the event, wherein the set of predetermined diversion rules comprises a rules database cross-referencing the device with types of calls employing the device for determining a desired diversion action to be taken to effect call diversion for the requested call.

34. The distributed communication system as claimed in claim 33, further comprising means for detecting when the event requiring call diversion has passed and communicating an exit divert command to the device in response thereto for removing the device from the call diversion mode, the device responding to the exit divert command by resuming normal call processing.

35. The method as claimed in claim 33, wherein the distributed communication system employs at least one of H.323 protocol and session initiation protocol (SIP).

36. The method as claimed in claim 33, wherein the device comprises one of a gateway, a gatekeeper, a client, and a private branch exchange (PBX).

* * * * *